C. E. MORRIS.
AUTOMOBILE OPERATED MECHANISM.
APPLICATION FILED DEC. 18, 1916.

1,301,294.

Patented Apr. 22, 1919.
4 SHEETS—SHEET 1.

WITNESS
R.C. Hamilton

INVENTOR.
Charles E. Morris
BY Warren D. House,
His ATTORNEY

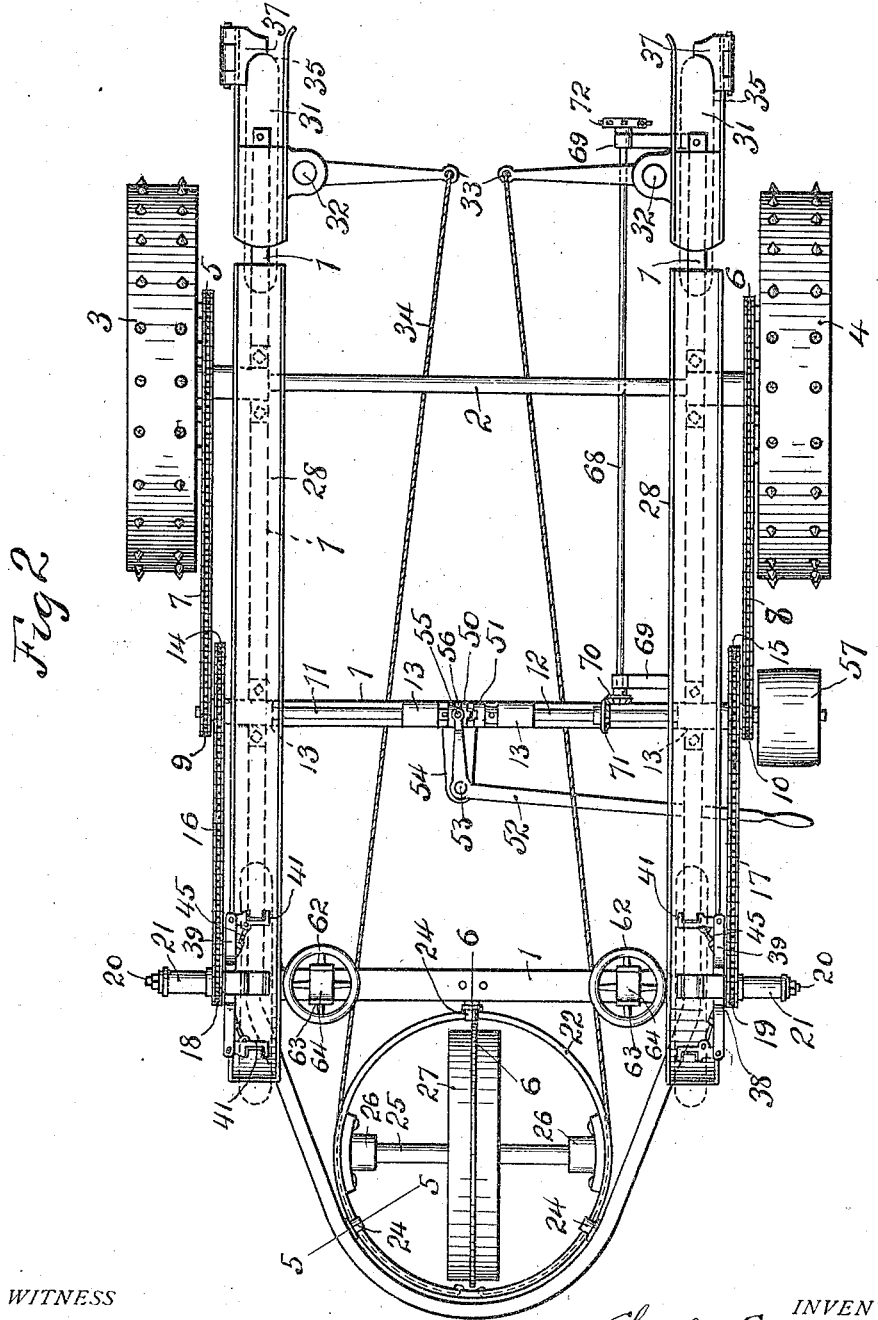

C. E. MORRIS.
AUTOMOBILE OPERATED MECHANISM.
APPLICATION FILED DEC. 18, 1916.
1,301,294.
Patented Apr. 22, 1919.
4 SHEETS—SHEET 3.
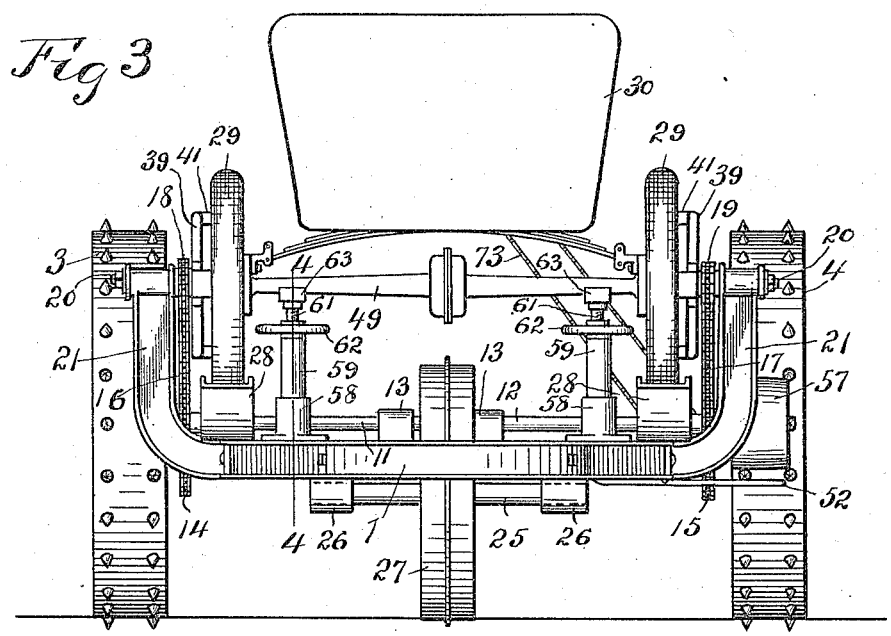
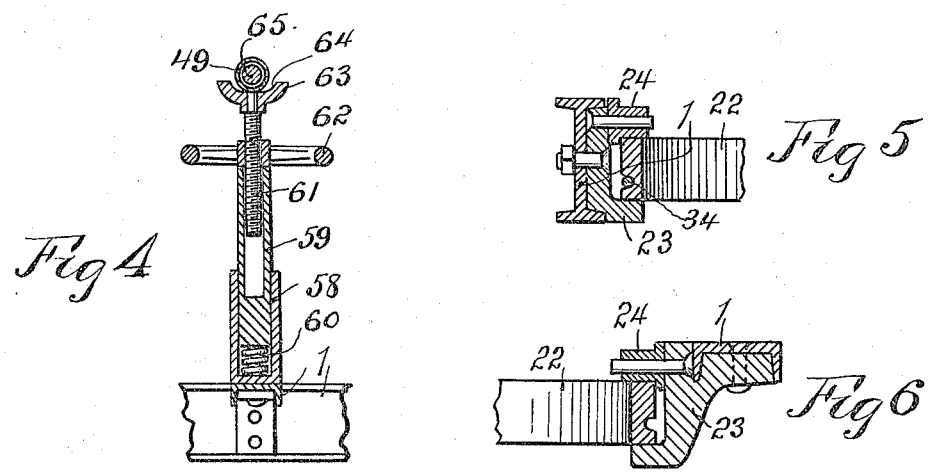

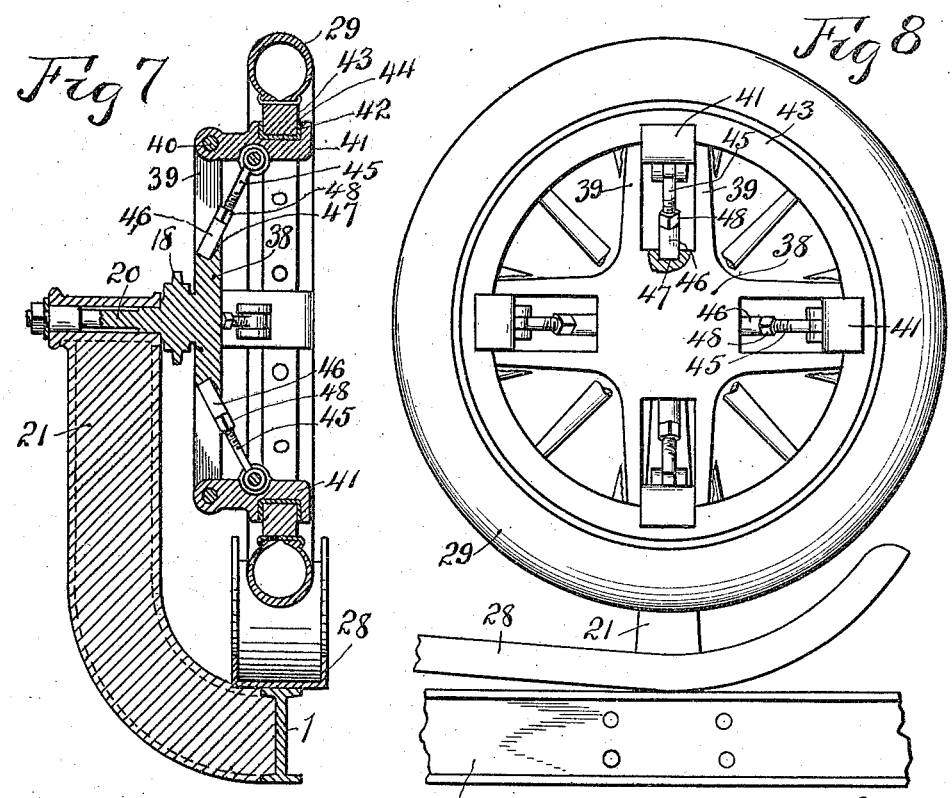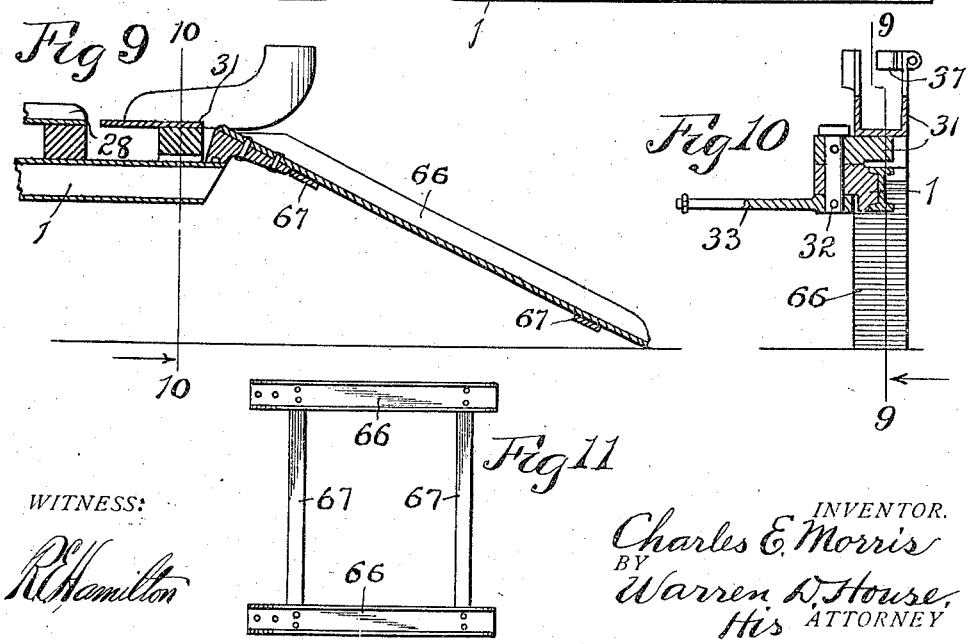

UNITED STATES PATENT OFFICE.

CHARLES E. MORRIS, OF LEAVENWORTH, KANSAS.

AUTOMOBILE-OPERATED MECHANISM.

1,301,294.

Specification of Letters Patent. Patented Apr. 22, 1919.

Application filed December 18, 1916. Serial No. 137,708.

*To all whom it may concern:*

Be it known that I, CHARLES E. MORRIS, a citizen of the United States, residing at Leavenworth, in the county of Leavenworth and State of Kansas, have invented a certain new and useful Improvement in Automobile-Operated Mechanisms, of which the following is a specification.

My invention relates to improvements in automobile operated mechanisms.

The object of my invention is to provide a novel mechanism adapted to support an automobile and with which the driving mechanism of the automobile may be employed, when operated in the usual manner, to produce power for any desired purpose.

A further object of my invention is to provide a wheeled support adapted to carry an automobile and provided with novel means by which the driving mechanism of the automobile may be employed to propel the wheeled support.

Still another object of my invention is to provide novel means by which the usual steering mechanism of an automobile may be employed to steer a wheeled support which carries and is propelled by an automobile.

Still another object of my invention is to provide novel means by which the weight of an automobile may be shifted from one or both driving wheels thereof combined with transmission means arranged to be driven by the driving mechanism of the automobile, whereby lateral strain upon the driving wheels may be avoided.

Another object of my invention is to provide novel means by which the usual differential gearing of an automobile may be made effective or ineffective at the option of the operator, whereby the driving wheels of the automobile may be made to operate independently or conjointly in transmitting power.

My invention provides further a novel hoisting mechanism for lifting the automobile so as to shift the weight thereof from the driving wheels.

Still another object of my invention is to provide means additional to the usual cooling mechanism of an automobile for cooling the engine thereof when the automobile is employed to drive a wheeled support which carries the automobile.

My invention provides further novel means for effecting driving connection between one of the driving wheels of an automobile and power transmission means connected therewith.

The novel features of my invention are hereinafter fully described and claimed.

In the accompanying drawings which illustrate the preferred embodiment of my invention, Figure 1 is a side elevation of a tractor provided with my improvement and of an automobile of the ordinary type mounted on the tractor and arranged to propel and steer the same.

Fig. 2 is a plan view of the tractor shown in Fig. 1, the automobile being removed therefrom.

Fig. 3 is a rear elevation of what is shown in Fig. 1.

Fig. 4 is an enlarged vertical sectional view on the line 4—4 of Fig. 3.

Fig. 5 is a vertical sectional view on the line 5—5 of Fig. 2.

Fig. 6 is a vertical sectional view on the line 6—6 of Fig. 2.

Fig. 7 is an enlarged vertical sectional view on the line 7—7 of Fig. 1.

Fig. 8 is an inside elevation of what is shown in Fig. 7.

Fig. 9 is a longitudinal vertical sectional view on the line 9—9 of Fig. 10, showing a portion of the forward end of the tractor and the skid over which the automobile runs when being loaded upon or unloaded from the tractor.

Fig. 10 is a vertical sectional view on the line 10—10 of Fig. 9.

Fig. 11 is a plan view of the skid used for loading and unloading the automobile.

Similar reference characters designate similar parts in the different views.

Figure 1:
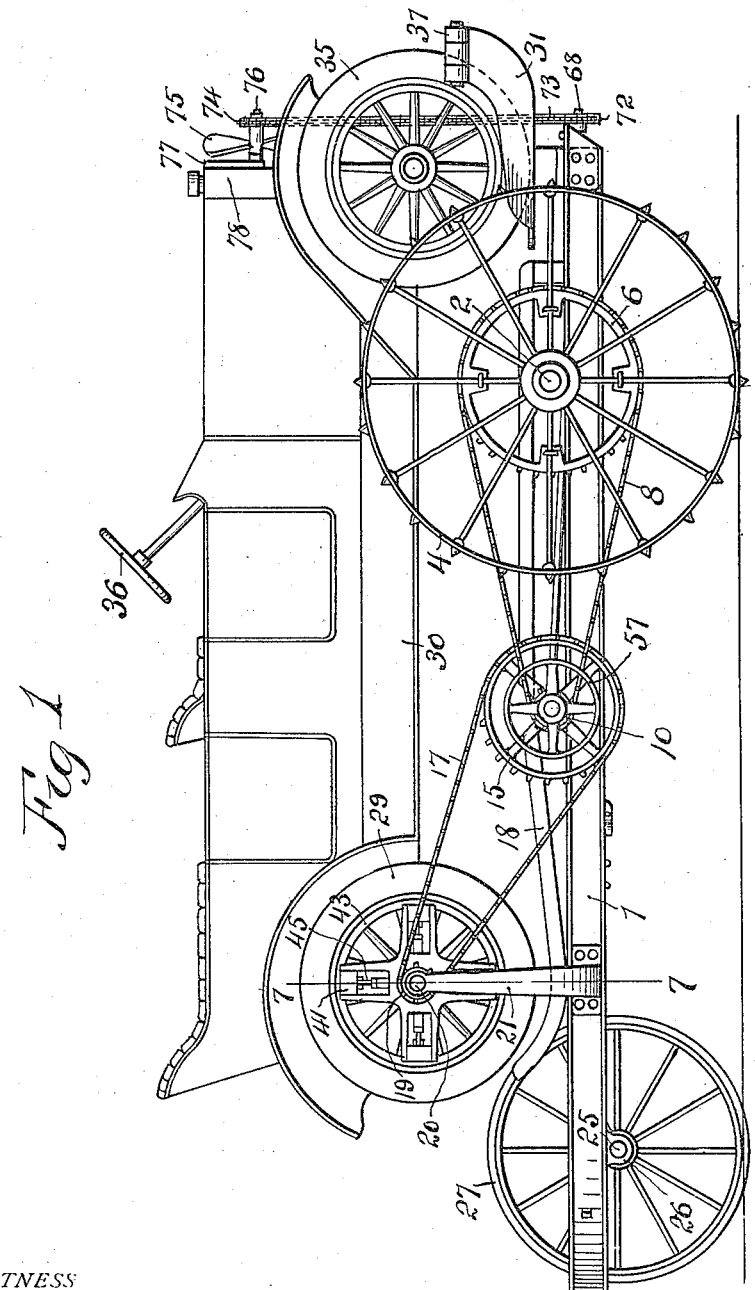

1 designates a horizontal frame of any suitable construction, preferably composed of structural steel. The frame 1 is supported by a transverse front axle 2 on which are mounted and independently rotatable two traction wheels 3 and 4, to which are respectively rigidly secured two sprocket wheels 5 and 6, on which are respectively mounted two chain belts 7 and 8 which are also respectively mounted on two sprocket wheels 9 and 10 which are respectively rigidly secured to two transverse horizontal shafts 11 and 12, which are mounted in suitable bearings 13 supported on the frame 1.

Rigidly secured to the shafts 11 and 12 respectively are two sprocket wheels 14 and 15 which are respectively connected by chain belts 16 and 17 with two sprocket wheels 18 and 19 which are provided respectively on two horizontal shafts 20, which are alike in construction and which are respectively rotatably mounted in two standards 21, the lower ends of which are rigidly secured to opposite sides respectively of the frame 1 adjacent to the rear thereof.

An annular horizontal oscillatable member 22 is mounted upon lugs 23, which are secured to the frame 1, Figs. 5 and 6, and which have rotatably attached to them rollers 24 which are disposed above and serve as bearings for the member 22.

A horizontal transverse shaft 25, Fig. 2, disposed diametrically in the annular member 22 has its ends rotatably mounted respectively in two bearings 26, which are secured to the inner periphery of the annular member 22. Secured to the shaft 25 is a steering carrying wheel 27.

Mounted on the top of the frame 1 are two longitudinal parallel channel members 28 which serve as a track upon which the rear driving wheels 29 of an automobile 30 may run.

Two channel wheel supports 31 are mounted upon the frame 1 and are pivotally connected therewith by two vertical pins 32, to which are respectively secured two inwardly extending arms 33, to which are respectively secured the ends of a cable 34 which embraces and passes around the rear side of the annular oscillatable member 22.

The channel wheel supports 31 are adapted to respectively receive and to support the front wheels 35 of the automobile.

When the steering wheel 36 of the automobile is turned, it will in the usual manner swing the front wheels 35 to the right or left, and the wheel supports 31 will be correspondingly swung, thereby turning the rear carrying wheel 27 of the tractor in the proper direction for steering the tractor. This will be effected through the intermediacy of the arms 33 and cable 34.

For releasably holding the front wheels 35 from forward movement, there are provided two latch members 37 which are respectively pivoted to the wheel supports 31, so as to be swung to and from a position at the forward side of the wheels 35.

Each shaft 20 at its inner side is provided with a head 38, Fig. 7, and Fig. 8. The head 38 is provided with a plurality of pairs of laterally extending arms 39. Pivoted to and between each pair of arms 39 by a transverse bolt 40 is a clamping member 41, which is provided at one side with a recess 42 which is adapted to embrace the inner side of a rim 43 of the adjacent driving wheel 29 of the automobile. Intermediate of the rim 43 and the arm 41 in the recess 42 is provided rubber or other suitable cushioning material 44.

Pivoted to each clamping member 41 is a brace comprising a threaded rod 45, Figs. 7 and 8, which is fitted in a screw-threaded hole at one end of a block 46, the other end of which is adapted to enter a recess 47 which is provided in the head 38 between the adjacent pair of arms 39. A lock nut 48 is mounted on the rod 45 and is adapted to bear against the block 46.

By loosening the lock nuts 48, the blocks 46 may be turned on the rods 45, so as to tightly clamp the members 41 against the rim 43. If now the engine of the automobile be driven, the driving wheels 29 will be rotated in the usual manner through the intermediacy of the differential gearing and the rear axle members usual to the ordinary automobile construction.

In order that the automobile wheels 29 may be lifted into positions for being clamped by the members 41, I provide suitable means for lifting the rear axle casing 49, Figs. 3 and 4, and thereby lifting the driving wheels 29 so as to shift therefrom the weight of the automobile, and at the same time to dispose the driving wheels that they may be clamped by the members 41 in the manner shown in Figs. 7 and 8.

When so clamped, and the automobile engine is driven, the driving wheels 29 will be rotated, thereby rotating the heads 38 and the sprocket wheels 18. The traction wheels 3 and 4, will thereby be driven through the intermediacy of the chains 16 and 17, sprocket wheels 9 and 10, shafts 11 and 12, sprocket wheels 14 and 15, chain belts 7 and 8, and sprocket wheels 5 and 6.

Inasmuch as the load is lifted off from the driving wheels 29, the lateral strain upon the driving wheels will be eliminated, as well as the load strain of the automobile body.

The ordinary automobile is provided with differential gearing located in the axle casing 49, which permits the two driving wheels 29 to rotate at different speeds, as is well known.

In order that both the traction wheels 3 and 4 may be driven positively at the same rate of speed, when desired, I provide means for interlocking the two transmission means which respectively connect the driving wheels 29 with the traction wheels 3 and 4. This interlocking is effected by interlocking the two shafts 11 and 12. For effecting this, there is provided a clutch member 50, Fig. 2, which is slidable into and out of engagement with a clutch member 51 rigidly secured to the shaft 12, the clutch member 50 being splined on the shaft 11, so as to be longitudinally slidable thereon while at the same time being held from rotation on said shaft 11.

For sliding the clutch member 50 into and out of engagement with the clutch member 51, there is provided a hand operated bell crank lever 52, which is pivoted by a vertical pin 53 to a bracket 54, which is supported by the frame 1. One arm of the bell crank lever, 52, is bifurcated and is provided in the bifurcated portion with two pins 55 which are disposed in an angular groove 56 in the periphery of the clutch member 50.

When the operating lever 52 is disposed as shown in Fig. 2 with the clutch members 50 and 51 separated from each other, the differential gearing of the automobile will be effective for the purposes of its usual functions.

When the clutch members 50 and 51 are interlocked, the shafts 11 and 12 will be interlocked, and the differential gearing of the automobile will become ineffective for permitting the driving wheels 29 to revolve at different speeds relative to each other. The traction wheels 3 and 4 will, in such a case, be revolved at the same rate of speed.

Secured to the shaft 12 is a pulley 57 from which power may be derived for any desired purpose. When the pulley 57 is to be employed for transmitting power to some other mechanism, not shown, the lever 52 is disposed so as to interlock the clutch members 50 and 51 with each other. When the pulley 57 is to be used for driving purposes, the belts 7 and 8 are thrown off from the pulleys 9 and 10 respectively.

When it is desired to remove the automobile from the tractor, the nuts 47 are loosened and the blocks 46 are screwed inwardly on the rods 45, thereby permitting the rods 45 to be swung outwardly, so that the blocks 46 clear the heads 38, at which time the clamping members 41 may be swung outwardly from engagement with the rims 43 of the driving wheels 29.

The axle casing 49 is then lowered until the wheels 29 rest upon the channel members 28.

For lifting the axle casing 49, any suitable means may be employed. For this purpose, I have shown two jacks adapted for this purpose. Each jack comprises the following described parts. Secured to the frame 1 is a stationary tubular member 58, in which is vertically slidably mounted a tubular member 59, the lower end of which is supported on a coil spring 60, Fig. 4, the lower end of which is supported upon the bottom of the member 58. Vertically movable in the tubular member 59 is a screw 61 which extends through and has threaded engagement with a hand wheel 62, which has its hub resting upon the upper end of the tubular member 59. Pivotally mounted upon the upper end of the screw 62 is a cap 63, which in its upper side is provided with a groove 64 which is adapted to receive and support the axle casing 49 which contains the usual axle members, one of which designated by 65, is shown in Fig. 4.

The two jacks are disposed respectively at opposite sides of the longitudinal center of the support 1 and intermediate of the channel members 28.

In Fig. 11 is shown a skid which is provided with two channel members 66 disposed parallel with each other and connected together by two transverse bars 67. The channel members 66 are spaced apart the proper distance for the reception of the automobile wheels. When the automobile is to be used to drive the tractor or the pulley 57, one end of the skid is placed upon the forward end of the frame 1 in position such that the channel members 66 are in alinement respectively with the wheel supports 31, as shown in Fig. 9. The automobile is then run up the skid and onto the frame 1, the driving wheels 29 being run onto the channel members 28, the rear portions of which are hollowed and turned upwardly at their rear ends, as shown in Fig. 1, for the reception of the wheels 29. The wheels 35 are disposed in the supports 31, after which the latch members 37 are swung to the blocking position shown in Fig. 2, thus holding the automobile from forward or rearward movement.

The hand wheels 62 are then turned so as to have the caps 63 of the jacks engage and lift the axle casing 49 to a position in which the wheels 29 will be disposed for proper engagement with the clamping members 41, that is concentrically with the shafts 20. The clamping members 41 are then swung into engagement with the rims 44, after which the rods 45 are swung to the position shown in Fig. 7, in which position the blocks 46 will be in the recesses 47. The blocks 46 are then unscrewed until their outer ends bear tightly against the adjacent heads 38, after which the nuts 48 are tightened against said blocks.

The weight of the automobile has now been shifted from the wheels 29 to the jacks. The engine of the automobile may then be run thereby driving the wheels 29 which in turn will respectively drive the two transmission mechanisms which respectively connect the wheels 29 with the traction wheels 3 and 4, which two transmission means have already been described.

The tractor will thus be driven and it may be turned to right or left by operating the steering wheel 36 of the automobile in the usual manner.

When it is desired to interlock the two transmission mechanisms so as to positively drive the traction wheels 3 and 4 conjointly and at the same rate of speed and with the same power, the lever 52 is swung so as to lock together the clutch members 50 and 51 in the manner already described. The transmission means connecting the driving wheels of the automobile and the traction wheels are preferably arranged to drive the traction wheels much slower than the wheels 29. As the engine of the automobile runs rapidly while moving slowly through the air when mounted on the tractor, the usual cooling apparatus provided on the automobile for the cooling of the engine does not always suffice. In order that the engine may be cooled sufficiently when the tractor is being run by the automobile, additional cooling means is provided.

For this purpose any suitable means may be employed. In the drawings, I have illustrated mechanism which may be used for this purpose and comprising the following described parts:—

A horizontal longitudinal shaft 68 is rotatably mounted in bearings 69 secured to the frame 1. Secured to the shaft 68 is a bevel gear wheel 70 which meshes with a bevel gear wheel 71 secured to the shaft 12. Secured to the forward end of the shaft 68 is a sprocket wheel 72 which is connected by a chain belt 73 with a sprocket wheel 74 secured to the hub of a fan 75 which is rotatably mounted on a stud 76 secured to a plate 77, which is fastened to the forward side of the radiator 78 of the automobile. The arrangement of the blades of the fan 75 is such that air will be blown through the radiator 78 when the tractor is driven forwardly.

I do not limit my invention to the structure shown and described, as modifications, within the scope of the appended claims, may be made without departing from the spirit of my invention.

What I claim is:

1. In an automobile operated mechanism, a support for an automobile, rotary driven means thereon, resilient means on said support adapted to lift and support an automobile carried by said support and to shift the weight of the automobile from one of its driving wheels, and transmission means having driving connection with said driven means, and having releasable means for driving engagement with said driving wheel.

2. In an automobile operated mechanism, a support for an automobile, rotary driven means thereon, resilient means on said support for engaging and lifting a portion of an automobile carried by said support and to shift the weight of the automobile from one of its driving wheels, and transmission means having driving engagement with said driven means, and having means for releasable driving engagement with said driving wheel.

3. In an automobile operated mechanism, a support for an automobile, the support having a traction wheel, resilient means on said support adapted to lift and support an automobile carried by said support and to shift the weight of the automobile from one of its driving wheels to its driving axle casing, and transmission means having driving engagement with said traction wheel and having releasable means adapted for driving engagement with said driving wheel.

4. In an automobile operated mechanism, a support for an automobile, a driven member rotatably mounted thereon, a jack including a supporting spring carried by said support and adapted to engage and lift the axle casing and one driving wheel of an automobile carried by said support, and transmission means having driving engagement with said driven member and having releasable means adapted for driving engagement with said driving wheel.

5. In an automobile operated mechanism, a support for an automobile, a rotary member on said support provided with driving means, clamping members pivoted to said rotary member and adapted to be swung into and from driving engagement with the rim of a driving wheel of the automobile, and braces pivoted to said clamping members respectively and adapted to be swung into releasable engagement with said rotary member.

In testimony whereof I have signed my name to this specification.

CHARLES E. MORRIS.

Copies of this patent may be obtained for five cents each, by addressing the "Commissioner of Patents, Washington, D. C."